US012784644B2

United States Patent

(12) United States Patent
Hsiao et al.

(10) Patent No.: US 12,784,644 B2
(45) Date of Patent: Nov. 3, 2026

(54) DISPLAY DEVICE CALIBRATION SYSTEM, DISPLAY DEVICE CALIBRATION METHOD AND NON-TRANSITORY PROCESSOR-READABLE STORAGE MEDIUM

(71) Applicant: Optoma Corporation, New Taipei City (TW)

(72) Inventors: Yu-Tsung Hsiao, New Taipei City (TW); Tai-Ying Su, New Taipei City (TW); Yen-Hsiang Hung, New Taipei City (TW); Cheng-Chien Ou, New Taipei City (TW)

(73) Assignee: Optoma Corporation, New Taipei City (TW)

( * ) Notice: Subject to any disclaimer, the term of this patent is extended or adjusted under 35 U.S.C. 154(b) by 82 days.

(21) Appl. No.: 18/810,530

(22) Filed: Aug. 21, 2024

(65) Prior Publication Data

US 2026/0057819 A1 Feb. 26, 2026

(51) Int. Cl.

*G09G 3/20* (2006.01)
*G06T 7/73* (2017.01)
*G06T 7/90* (2017.01)

(52) U.S. Cl.

CPC ............. *G09G 3/2096* (2013.01); *G06T 7/73* (2017.01); *G06T 7/90* (2017.01);
(Continued)

(58) Field of Classification Search

CPC .... G06F 3/1438; G06G 3/2003; G06G 3/006; G06G 3/32; G06G 3/20
(Continued)

(56) References Cited

U.S. PATENT DOCUMENTS

2013/0321676 A1* 12/2013 Silverstein ........... H04N 23/631 348/242
2015/0242178 A1 8/2015 Cho et al.
(Continued)

FOREIGN PATENT DOCUMENTS

CN 105096816 11/2015

OTHER PUBLICATIONS

Zaman N., Sarker P. Tavakkoli A., Calibration of head mounted displays for vision research with virtual reality. Journal of Vision, 23(6), pp. 7-7. (Year: 2023).*
(Continued)

*Primary Examiner* — Phu K Nguyen
(74) *Attorney, Agent, or Firm* — JCIPRNET

(57) ABSTRACT

A display device calibration system, a display device calibration method and a storage medium are provided. The system includes an electronic device and a display device. The electronic device includes a first processor and a camera. The display device includes a second processor and a plurality of display modules. The first processor obtains a first image of a part of the display modules and analyzes the first image to determine a target single color value and a reference single color value. The first processor obtains an estimated value according to the target single color value and the reference single color value and determines whether the estimated value is within a predetermined range. The first processor provides a correction signal to the display device when the estimated value is not within the predetermined range, and adjusts the target single color value until the estimated value is within the predetermined range.

20 Claims, 6 Drawing Sheets

(52) U.S. Cl.
CPC .............. *G06T 2207/30208* (2013.01); *G09G 2300/026* (2013.01); *G09G 2320/0666* (2013.01); *G09G 2320/0693* (2013.01); *G09G 2320/08* (2013.01)

(58) Field of Classification Search
USPC .......................................................... 345/418
See application file for complete search history.

(56) References Cited

U.S. PATENT DOCUMENTS

| | | | | |
|---|---|---|---|---|
| 2018/0150058 | A1* | 5/2018 | Shapiro | G05B 19/4093 |
| 2019/0025588 | A1* | 1/2019 | Osterhout | G02B 13/009 |
| 2019/0025589 | A1* | 1/2019 | Haddick | G02B 27/0172 |
| 2019/0025590 | A1* | 1/2019 | Haddick | G02B 27/0093 |
| 2019/0213941 | A1 | 7/2019 | Beon et al. | |
| 2020/0372228 | A1* | 11/2020 | Rodriguez | G06Q 30/00 |
| 2020/0380226 | A1* | 12/2020 | Rodriguez | G06F 3/147 |
| 2021/0065606 | A1 | 3/2021 | Park | |
| 2021/0157998 | A1* | 5/2021 | Rodriguez | G06K 7/10861 |
| 2022/0036836 | A1 | 2/2022 | Abe | |

OTHER PUBLICATIONS

Yang, Chi-Hsien. "Determining an Optimal Display Module-Level White Point Target for a Display Module." (2023). (Year: 2023).*
"Search report of European counterpart Application", issued on Sep. 1, 2025, p. 1-p. 13.

* cited by examiner

DISPLAY DEVICE CALIBRATION SYSTEM, DISPLAY DEVICE CALIBRATION METHOD AND NON-TRANSITORY PROCESSOR-READABLE STORAGE MEDIUM

BACKGROUND

Technical Field

The disclosure relates to calibration technology, and particularly relates to a display device calibration system and a display device calibration method thereof and a non-transitory processor-readable storage medium.

Description of Related Art

A general display device has plurality of sub-display modules. The color correction of the display device is through the adjustment of the color coefficient, so that the brightness performance of different sub-display modules in the display device may be consistent. However, the traditional adjustment of color coefficients is through manual adjustment in the manufacture stage or by a user's operation during use, which has the disadvantages of being labor-intensive, time-consuming and inaccurate in adjustment.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a display device calibration system, a display calibration method, and a non-transitory processor-readable storage medium, which are adapted to achieve display device calibration.

Additional aspects and advantages of the disclosure will be set forth in the description of the techniques disclosed in the disclosure.

In order to achieve one or a portion of or all of the objects or other objects, the disclosure provides a display device calibration system including an electronic device and a display device. The electronic device includes a first processor and a camera. The first processor is electrically connected to the camera. The display device is communicatively connected to the electronic device. The display device includes a second processor and a plurality of display modules. The first processor obtains a first image of a part of the plurality of display modules through the camera. The first processor analyzes the first image to determine a target single color value of a target display module and a reference single color value of a reference display module. The part of the plurality of display modules comprises the target display module and the reference display module. The first processor obtains an estimated value according to the target single color value and the reference single color value. The first processor determines whether the estimated value is within a predetermined range. The first processor is configured to provide a correction signal to the display device when the estimated value is not within the predetermined range. The first processor adjusts the target single color value until the estimated value is within the predetermined range.

In an embodiment of the disclosure, the first processor performs that the target single color value divides by the reference single color value to generate the estimated value.

In an embodiment of the disclosure, the first processor sends an identification pattern requirement signal to the second processor for triggering the plurality of display modules to display a plurality of identification patterns according to the identification pattern requirement signal. The electronic device obtains a second image of the display device through the camera. The first processor analyzes the second image to obtain position information of the plurality of display modules according to the plurality of identification patterns. The first processor determines positions of the target display module and the reference display module according to the position information.

In an embodiment of the disclosure, the plurality of identification patterns are a plurality of data matrices or a plurality of quick response codes.

In an embodiment of the disclosure, the second image comprises an image of a plurality of module images corresponding to the part of the plurality of display modules.

In an embodiment of the disclosure, the first image comprises an image of a plurality of module images corresponding to the part of the plurality of display modules.

In an embodiment of the disclosure, the first processor sends a color pattern requirement signal to the second processor to require the plurality of display modules. The target display module and the reference display module are driven to display same color pattern according to the color pattern requirement signal.

In an embodiment of the disclosure, the target display module and the reference display module display same red pattern, same green pattern, same blue pattern, or same white pattern.

In an embodiment of the disclosure, each of the plurality of display modules includes a third processor and a storage medium. The third processor is communicatively connected to the second processor. The storage medium is electronically coupled to the third processor, and stores a setting single color value. The third processor of the target display module reads the setting single color value from the storage medium. The third processor of the target display module provides the setting single color value to the first processor.

In an embodiment of the disclosure, the third processor overwrites the adjusted setting single color value into the storage medium of the target display module.

In order to achieve one or a portion of or all of the objects or other objects, the disclosure provides the display device calibration method including: triggering a plurality of display modules of a display device to display a plurality of identification patterns; obtaining a first image of a part of the plurality of display modules through a camera; analyzing the first image to determine a target single color value of a target display module and a reference single color value of a reference display module, wherein the part of the plurality of display modules comprises the target display module and the reference display module; obtaining an estimated value according to the target single color value and the reference single color value; determining whether the estimated value is within a predetermined range; providing a correction signal to the display device when the estimated value is not within the predetermined range; and adjusting the target single color value until the estimated value is within the predetermined range.

In an embodiment of the disclosure, the step of obtaining the estimated value comprises: performing that the target single color value divides by the reference single color value to generate the estimated value.

In an embodiment of the disclosure, the display device calibration method further including the following steps: obtaining a second image of the display device through the camera; analyzing the second image to obtain position information of the plurality of display modules according to the plurality of identification patterns; and determining positions of the target display module and the reference display module according to the position information.

In an embodiment of the disclosure, the plurality of identification patterns are a plurality of data matrices or a plurality of quick response codes.

In an embodiment of the disclosure, the second image comprises an image of a plurality of module images corresponding to the part of the plurality of display modules.

In an embodiment of the disclosure, the first image comprises an image of a plurality of module images corresponding to the part of the plurality of display modules.

In an embodiment of the disclosure, the display device calibration method further including the following step: sending a color pattern requirement signal to the plurality of display modules; and driving the target display module and the reference display module to display same color pattern.

In an embodiment of the disclosure, the target display module and the reference display module display same red pattern, same green pattern, same blue pattern or same white pattern.

In an embodiment of the disclosure, the method further comprises: generating an adjusted setting single color value according to a setting single color value and the estimated value after receiving the setting single color value provided by the target display module.

In order to achieve one or a portion of or all of the objects or other objects, the disclosure provides the non-transitory processor-readable storage medium is configured to store at least one program, and be executed by a processor to perform steps: triggering a plurality of display modules of a display device to display a plurality of identification patterns; obtaining a first image of a part of the plurality of display modules through a camera; analyzing the first image to determine a target single color value of a target display module and a reference single color value of a reference display module, wherein the part of the plurality of display modules comprises the target display module and the reference display module; obtaining an estimated value according to the target single color value and the reference single color value; determining whether the estimated value is within a predetermined range; providing a correction signal to the display device when the estimated value is not within the predetermined range; and adjusting the target single color value until the estimated value is within the predetermined range.

Based on the above descriptions, the display device calibration system, the display calibration method, and the non-transitory processor-readable storage medium of the disclosure may effectively calibrate the color value of the display module of the display device.

Other objectives, features and advantages of the disclosure will be further understood from the further technological features disclosed by the embodiments of the disclosure wherein there are shown and described preferred embodiments of this invention, simply by way of illustration of modes best suited to carry out the disclosure.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
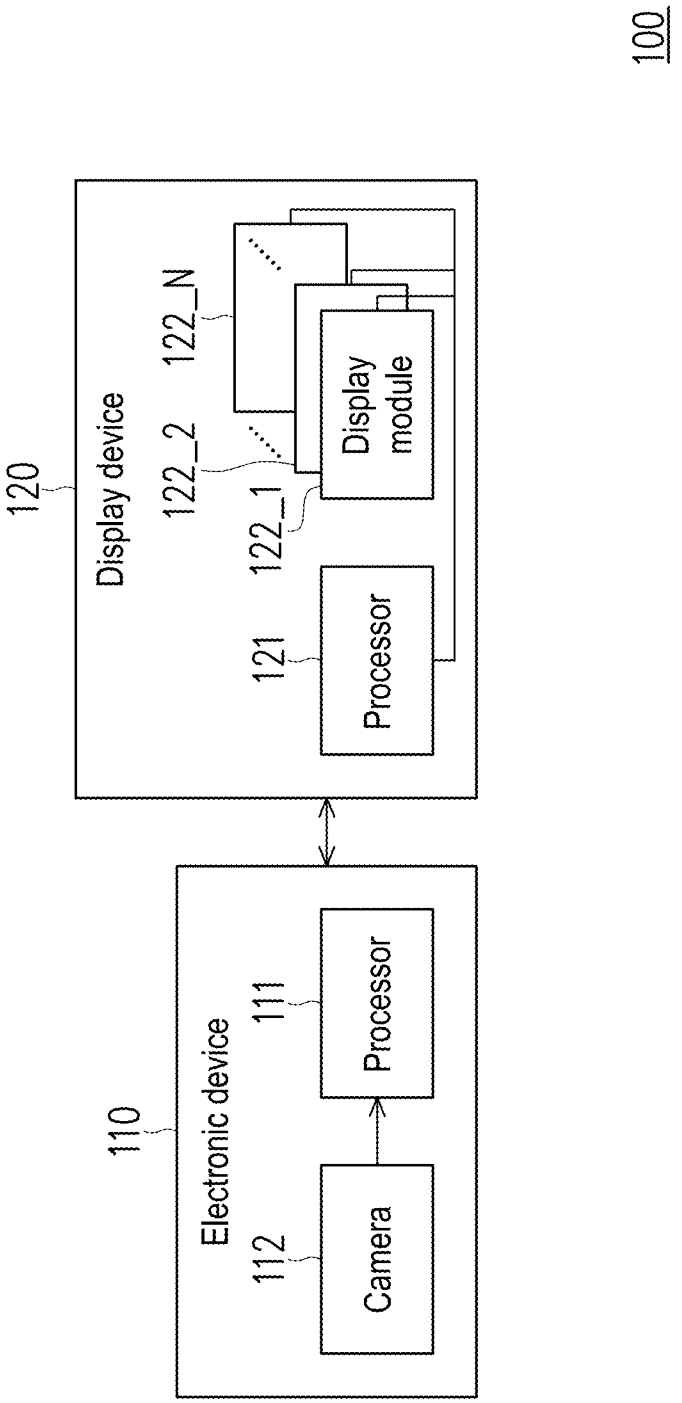
FIG. 1 is a schematic diagram of a display device calibration system according to an embodiment of the disclosure.

FIG. 1 is a schematic diagram of a display device calibration system according to an embodiment of the disclosure. Referring to FIG. 1, the display device calibration system 100 includes an electronic device 110 and a display device 120. The electronic device 110 includes a processor (first processor) 111 and a camera 112. The processor 111 is electrically connected to the camera 112. The display device 120 includes a processor (second processor) 121 and a plurality of display modules 122_1 to 122_N, where N is a positive integer. The processor 121 is electrically connected to the display modules 122_1 to 122_N. The electronic device 110 is communicatively connected with the display device 120 via a wired (for example HDMI cable) or wireless communication manner (for example WiFi). In the embodiment of the disclosure, the display device 120 is composed of the display modules 122_1 to 122_N a light emitting diode (LED) display device. Each of the display modules 122_1 to 122_N includes a light emitting diode (LED) panel, an OLED panel or a LCD panel. In the embodiment of the disclosure, each of the display modules 122_1 to 122_N may include a processor, a storage medium and a plurality of light emitting units. In the embodiment of the disclosure, the electronic device 110 may be a smart phone, but the disclosure is not limited thereto. In one embodiment of the disclosure, a camera is physically separated from the electronic device 110. The electronic device 110 may be a computer device or a processing device with communication function and photography function to connect with the camera by wire or wireless communication manner.

In the embodiment of the disclosure, the camera 112 of the electronic device 110 may capture an image of at least part of the display modules 122_1 to 122_N. In the embodiment of the disclosure, due to an image captured by camera 112 may be distortion, it is suitable that the camera 112 only captures the image of the target display module and one or a few reference display modules adjacent to the target display module. It is not necessary to capture an image of all display modules 122_1 to 122_N. And a user may determine which one is the target display module and which one is the at least one reference display module in the display modules 122_1 to 122_N by the electronic device 110. The electronic device 110 may determine whether to output a correction signal to the display device 120, so that the display device 120 may calibrate color values of the target display module in the first image, such that the target display module and the at least one reference display module are configured to display similar level of brightness. The similar level of brightness depends on observation of an observer.

The processor described in the disclosure may at least includes, for example, a central processing unit (CPU) with image data processing and computation functions, or other programmable general-purpose or special-purpose microprocessor, a digital signal processor (DSP), an image processing unit (IPU), a graphics processing unit (GPU), a programmable controller, an application specific integrated circuit (ASIC), a programmable logic device (PLD), other similar processing devices, circuits, chips or a combination of these devices or chips. The storage medium described in the disclosure at least includes, for example, a dynamic random access memory (DRAM), a flash memory or a non-volatile random access memory (NVRAM), hard disk drive (HDD), solid state drive (SSD) or similar components or a combination of the above components, etc. In the embodiment of the disclosure, the processor may access the storage medium and execute at least one program stored in the storage medium.

Figure 2:
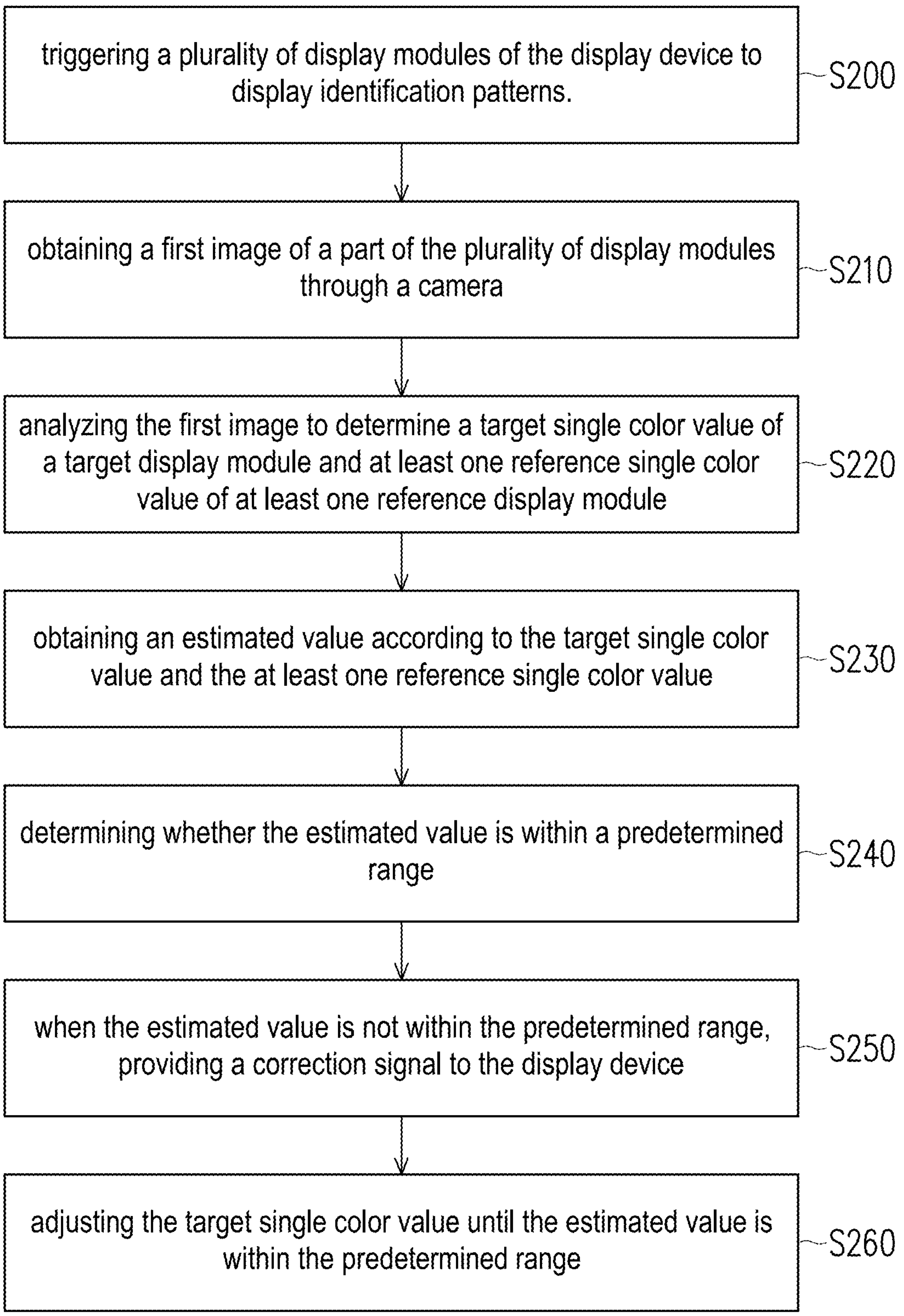
FIG. 2 is a schematic diagram of a display device calibration method according to an embodiment of the disclosure.

FIG. 2 is a schematic diagram of a display device calibration method according to an embodiment of the disclosure. Referring to FIG. 1 and FIG. 2, the display device calibration system 100 may execute the following steps S200 to S260 to implement calibration method. More specifically, the processor 111 of the electronic device 110 executes a calibration program stored in the storage medium 113 of the electronic device 110 in FIG. 3 to perform the steps S200 to S260. In step S200, the electronic device 110 may trigger a plurality of display modules of the display device 120 to display identification patterns. In step S210, the electronic device 110 may obtain a first image of a part of the display modules 122_1 to 122_N through the camera 112. In the embodiment of the disclosure, the processor 111 may determine a target display module and at least one reference display module in the part of the display modules 122_1 to 122_N by an operation of the user. In the embodiment of the disclosure, the target display module and the at least one reference display module may display the same red pattern, the same green pattern, the same blue pattern, the same white pattern or other single color pattern in order. In another embodiment of the disclosure, the target display module and the at least one reference display module may display G-B-R patterns or B-G-R patterns in order, the disclosure is not limited thereto.

In step S220, the processor 111 may analyze the first image to determine a target single color value of a target display module and at least one reference single color value of at least one reference display module. For example, the single color is red. In the embodiment of the disclosure, the target single color value and the reference single color value may be, for example, a grayscale value or a luminance value associated with red color. In step S230, the processor 111 may obtain an estimated value according to the target single color value and the at least one reference single color value. In the embodiment of the disclosure, the processor 111 may perform that the target single color value divides by the reference single color value to generate the estimated value.

In step S240, the processor 111 may determine whether the estimated value is within a predetermined range. In step S250, when the estimated value is not within the predetermined range, the processor 111 may provide a correction signal to the processor 121 of the display device 120. In the embodiment of the disclosure, the single color value may be a single color coefficient, such as a red color coefficient, a green color coefficient, a blue color coefficient, or a white color coefficient. In step S260, the processor 111 may adjust the target single color value until the estimated value is within the predetermined range. Therefore, the display device calibration system 100 may effectively calibrate the target single color value of the target display module such that the display device 120 provides uniform brightness.

In one embodiment of the disclosure, the non-transitory processor-readable storage medium may stores at least one program that causes a processor to execute the above display device calibration method.

Figure 3:
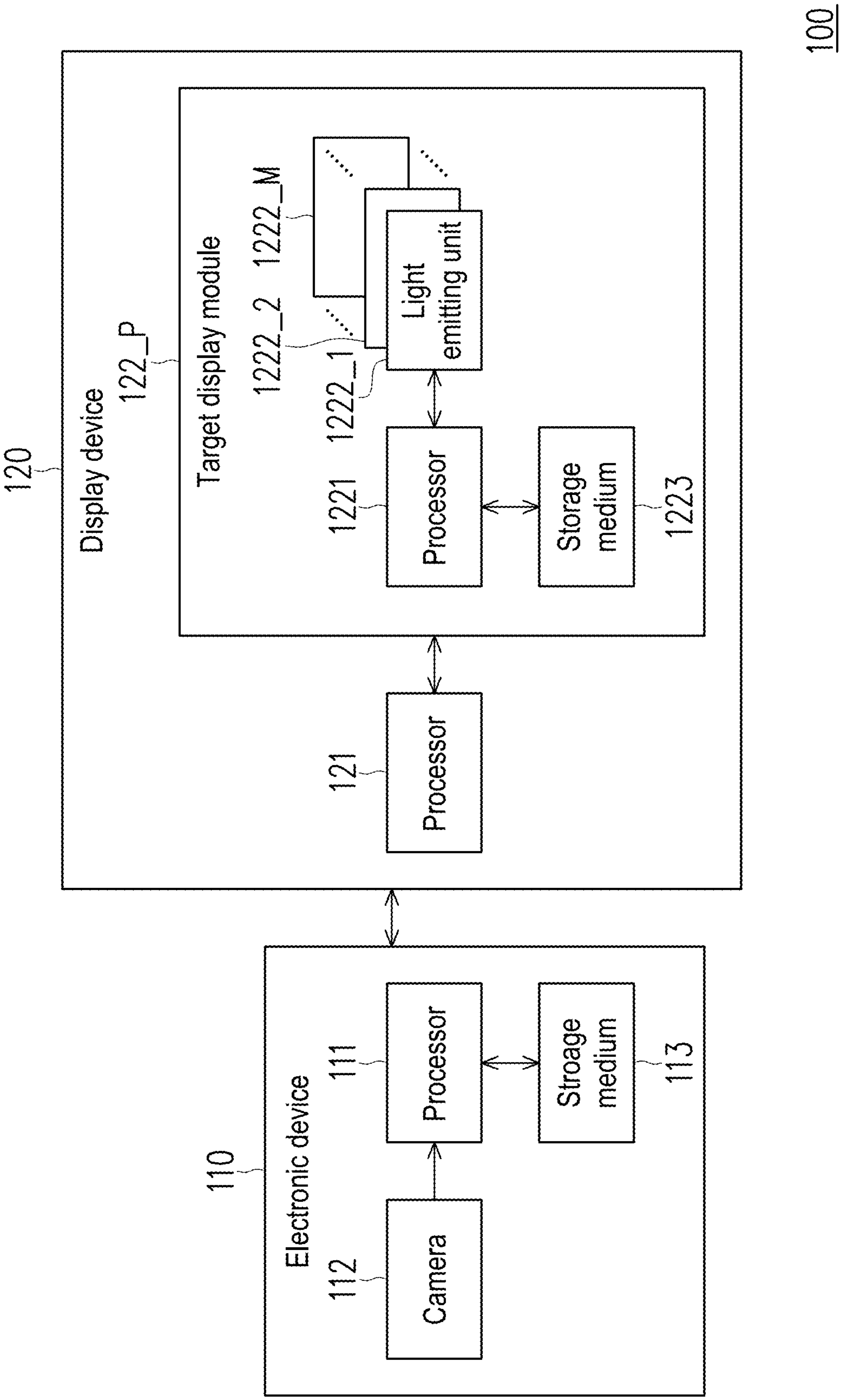
FIG. 3 is a schematic diagram of a display device calibration system according to another embodiment of the disclosure.

FIG. 3 is a schematic diagram of a display device calibration system according to another embodiment of the disclosure. Referring to FIG. 3, the display device calibration system 100 includes the electronic device 110 and the display device 120. The electronic device 110 further includes a storage medium 113. The storage medium 113 may store the calibration program. In the embodiment of the disclosure, taking one target display module 122_P as an example, the display device 120 includes the processor 121, the target display module 122_P, and a storage medium, and the display device 120 may further include other display modules, where P is a positive integer and between 1 and N. The processor 121 is electrically connected to the target display module 122_P. The target display module 122_P includes a processor (third processor) 1221, a plurality of light emitting units 1222_1 to 1222_M, and a storage medium 1223, where M is a positive integer. The processor 121 is communicatively connected to the processor 1221. The processor 1221 is electrically connected to the light emitting units 1222_1 to 1222_M, and the storage medium 1223.

Figure 4:
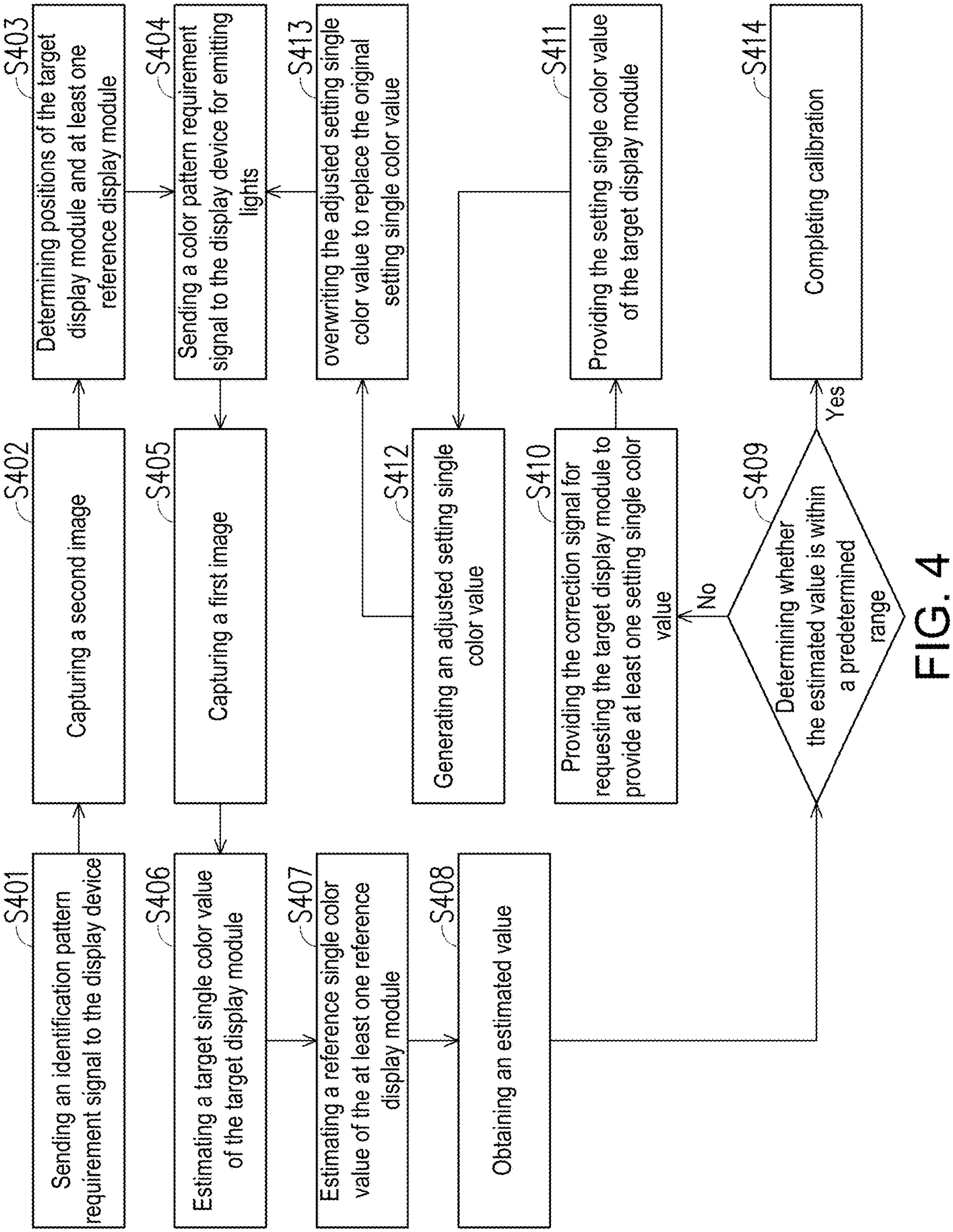
FIG. 4 is a schematic diagram of a display device calibration method according to another embodiment of the disclosure.
Figure 5:
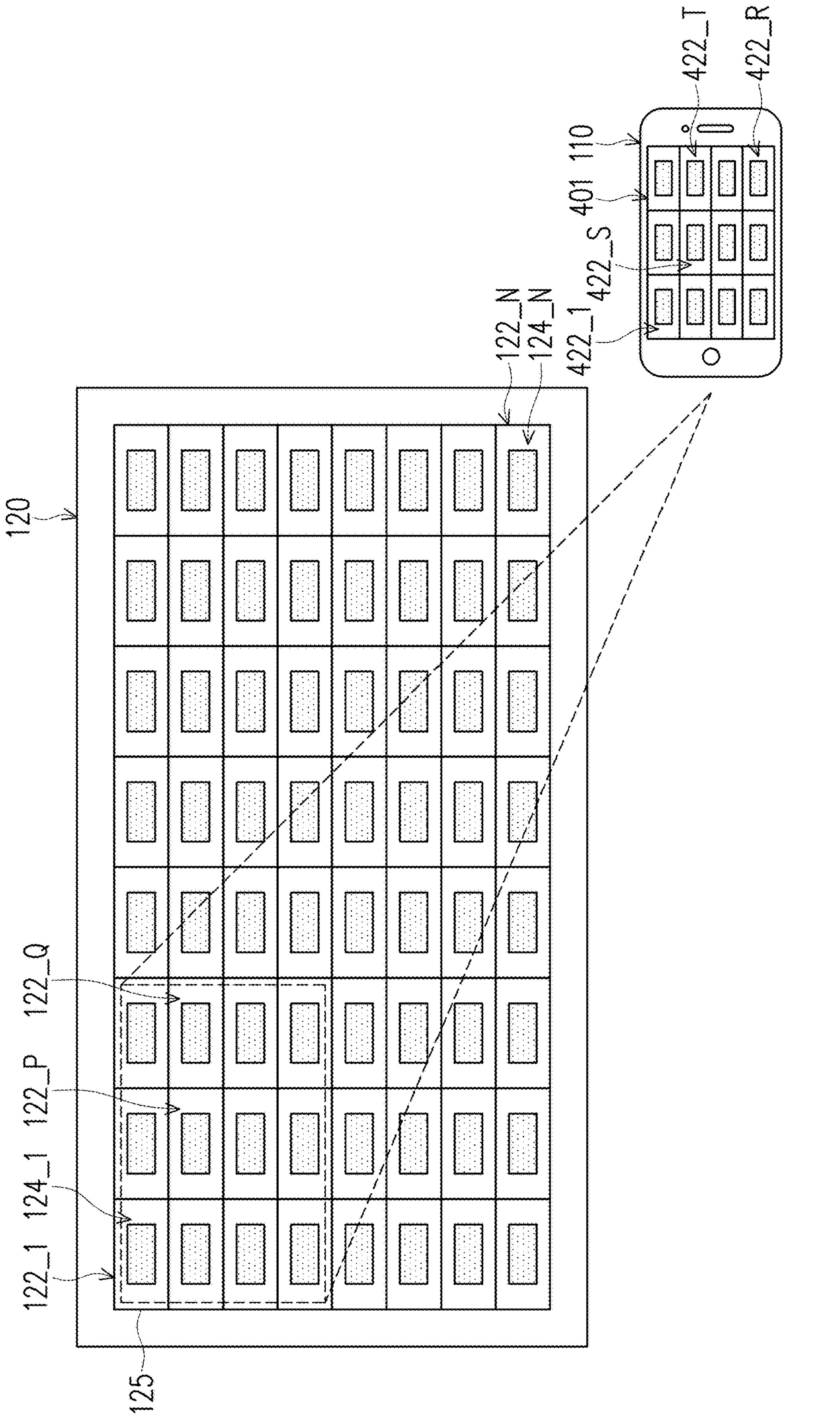
FIG. 5 is a schematic diagram of positioning the display device according to an embodiment of the disclosure.
Figure 6:
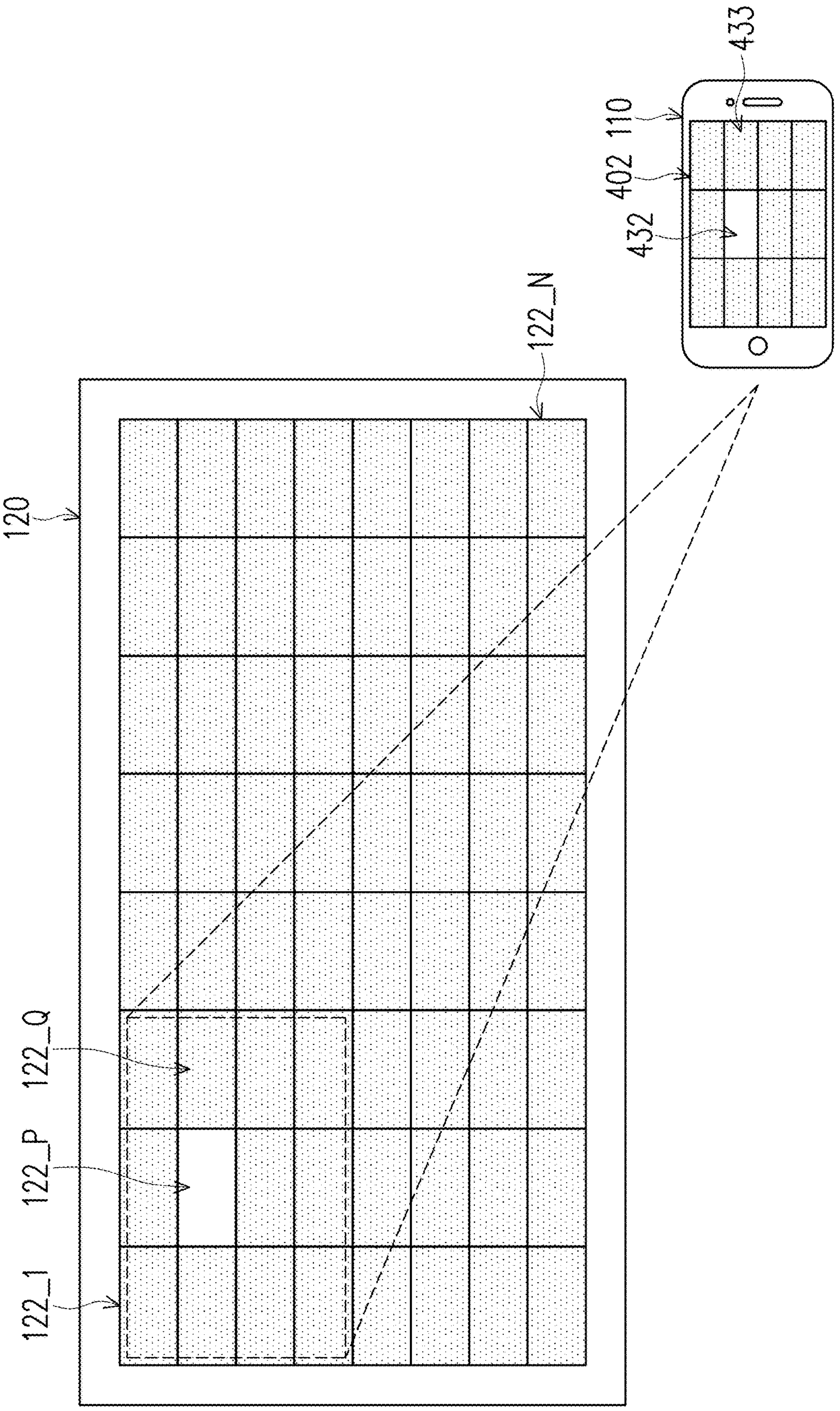
FIG. 6 is a schematic diagram of calibrating the display device according to an embodiment of the disclosure.

FIG. 4 is a schematic diagram of a display device calibration method according to another embodiment of the disclosure. FIG. 5 is a schematic diagram of positioning the display device according to an embodiment of the disclosure. FIG. 6 is a schematic diagram of calibrating the display device according to an embodiment of the disclosure. Referring to FIG. 3 to FIG. 6, the display device calibration system 100 may execute the following steps S401 to S414. One of display modules of the display device 120 is replaced with a new display module. The new display module represents the target display module 122_P. In step S401, all of display modules of the display device 120 are turned on. The processor 111 of the electric device 110 may send an identification pattern requirement signal to the processor 121 of the display device 120 for triggering the display modules 122_1 to 122_N to respectively display identification patterns 124_1 to 124_N according to the identification pattern requirement signal. As shown in FIG. 5, the processor 121 of the display device 120 may control the display modules 122_1 to 122_N to respectively display identification patterns 124_1 to 124_N according to the identification pattern requirement signal. For example, one display module 122_1 displays one identification patterns 124_1. The identification patterns 124_1 to 124_N are different from each other. Moreover, the identification patterns 124_1 to 124_N may be a plurality of data matrices or a plurality of quick response codes (QR codes). The data matrices may contain position information of the corresponding display module for positioning a location relationship of the display modules.

In step S402, the camera 112 may capture a second image 401 of an area 125 of the display device 120, but the disclosure is not limited thereto. In other of embodiment, the camera 112 of the electronic device 110 may capture an image of all the display modules 122_1 to 122_N. In this embodiment of the disclosure, the camera 112 may capture the second image 401 of the target display module 122_P and one or a few reference display modules 122_Q adjacent to the target display module 122_P. The electronic device 110 may capture the second image 401 of the part of the display device 120 through the camera 112 in a focused manner such that the second image 401 becomes a clear image. It is means that the position of the display device 120 is around the focus point of the lens of the camera 112. That is, a user may operate the electronic device 110 to capture the second image 401 of the part of the display device 120. The second image 401 may include an image of a plurality of module images 422_1 to 422_R, where R is a positive integer. The plurality of module images 422_1 to 422_R corresponds to the part of the plurality of display modules in area 125 of the display device 120. The processor 111 may analyze the second image 401 to obtain position information of the display modules according to the plurality of identification patterns. The position information of the display modules corresponding to the plurality of identification patterns in the image 401 may store in the storage medium 113 of the electronic device 110.

In step S403, the electronic device 110 may determine positions of the target display module 122_P and at least one reference display module 122_Q according to the position information. In the embodiment of the disclosure, the user may select a module image 422_S and at least one module image 422_T (e.g. by touching the touch panel of the electronic device 110) to determine the target display module 122_P corresponding to the module image 422_S and the at least one reference display module 122_Q corresponding to the at least one module image 422_T. In one embodiment of the disclosure, the processor 111 may select the module image 422_S and the module image 422_T adjacent to the module image 422_S to determine the target display module 122_P and the reference display module 122_Q. In one embodiment of the disclosure, two or more display modules adjacent to the target display module 122_P may be the reference display modules.

In step S404, the electronic device 110 may send a color pattern requirement signal to the display device 120 for emitting lights. As shown in FIG. 6, the processor 121 of the display device 120 may drive the processors of the display modules 122_1 to 122_N to display the same pure color pattern according to the color pattern requirement signal. The same pure color pattern may be a red pattern, a green pattern, or a blue pattern. More specifically, the processors of the display modules 122_1 to 122_N may drive the light emitting units to emit lights according to the setting single color value after receiving the color pattern requirement signal sending from the electronic device 110.

In step S405, the electronic device 110 may capture a first image 402 of a part of the display device 120 through the camera 112 in a soft-focus manner. A position of the display device 120 is not around the focus point of the lens of the camera 112. It should be noted that, since the pixels of the display modules 122_1 to 122_N in the image are regularly arranged, Moiré patterns are likely to appear when shooting. Therefore, the electronic device 110 may adjust a focal length of lens of the camera 112 when shooting, so that the first image 402 has the soft-focus effect (likes blurred, that is, position of the display device is not within the focal range of the lens of the camera), thereby effectively eliminating the moiré pattern phenomenon of the first image 402. Therefore, the first image 402 may be a blurred image.

In step S406, the processor 111 may estimate a target single color value of the target display module 122_P by analyzing a module image 432 in the first image 402. In the embodiment of the disclosure, the processor 111 may obtain the target single color value according to an average value of the single color values of pixels in the area of the module image 432.

In step S407, the processor 111 may also estimate at least one reference single color value of the reference display module 122_Q by analyzing a module image 433 in the first image 402. In the embodiment of the disclosure, the processor 111 may obtain the reference single color value according to an average value of the single color values of pixels in the area of the module image 433.

In step S408, the processor 111 may obtain an estimated value according to the target single color value and the at least one reference single color value. In the embodiment of the disclosure, the processor 111 may perform that the target single color value divides by the reference single color value to generate the estimated value. In step S409, the processor 111 may determine whether the estimated value is within a predetermined range. In one embodiment of the disclosure, the predetermined range may be about 0.9~1.1. If the estimated value is within the predetermined range, in step S414, calibration of the display device 120 is completed.

In step S409, if the estimated value is not within the predetermined range, the step S410 is performed. In step S410, the processor 111 provides the correction signal to the processor 121 of the display device 120 for requesting the processor 1221 of the target display module 122_P to provide the setting single color value of the target display module 122_P to the processor 121, for example, a setting single color (red) value of the target display module 122_P. More specifically, the processor 111 may require the processor 121 to notify the processor 1221 to read the setting single color value from the storage medium 1223 of the target display module 122_P. The storage medium 1223 may store at least one setting single color value (for example, setting red color value, setting blue color value, setting green color value and/or setting white color value). In step S411, the processor 1221 of the target display module 122_P may provide the setting single color value to the processor 121 of display device 120, and the processor 121 further provide the setting single color value of the target display module 122_P to the processor 111 via wireless or wire communicated manner. In step S412, after the processor 111 receives the setting single color value of the target display module 122_P, the processor 111 may generate an adjusted setting single color value according to the setting single color value and the estimated value. More specifically, the processor 111 may perform that the setting single color value divides the estimated value to generate the adjusted setting single color value. The processor 111 may provide the adjusted setting single color value to the processor 121 of the display device 120. The processor 121 may further provide the adjusted setting single color value to the processor 1221 of the target display module 122_P. In step S413, the processor 1221 may overwrite the adjusted setting single color value into the storage medium 1223 to replace the original setting single color value. Thus, the processor 1221 may drive the light emitting units 1222_1 to 1222_M to emit lights according to the adjusted setting single color value after receiving the color pattern requirement signal sending from the electronic device 110.

Then, the display device calibration system 100 may execute the steps S404 to S409 again to calibrate the target display module 122_P again by displaying the same pure color pattern until executing step S414, so that the displaying effects of the color or brightness of the target display module 122_P may be close to or equal to the at least one reference display module 122_Q. In one embodiment of the disclosure, the display device calibration system 100 may execute the steps S404 to S409 again to calibrate the target display module 122_P by displaying another pure color pattern. For example, the display device calibration system 100 may calibrate the target display module 122_P by displaying a red pattern, a green pattern, and a blue pattern sequentially.

In summary, the display device calibration system, the display calibration method, and the non-transitory processor-readable storage medium of the disclosure may effectively calibrate the color value of the target display module, such that all of display modules of the display device 120 may display similar level of brightness.

The foregoing description of the preferred embodiments of the disclosure has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device calibration system, comprising:

an electronic device, comprising a first processor and a camera, wherein the first processor is electrically connected to the camera; and a display device, communicatively connected to the electronic device, and comprising a second processor and a plurality of display modules, wherein the first processor is configured to obtain a first image of a part of the plurality of display modules through the camera, and the first processor is configured to analyze the first image to determine a target single color value of a target display module and a reference single color value of a reference display module, wherein the part of the plurality of display modules comprises the target display module and the reference display module, wherein the first processor is configured to obtain an estimated value according to the target single color value and the reference single color value, and the first processor is configured to determine whether the estimated value is within a predetermined range, wherein the first processor is configured to provide a correction signal to the display device in response to the estimated value not being within the predetermined range, wherein the first processor is configured to adjust the target single color value until the estimated value is within the predetermined range, wherein the first processor is configured to send an identification pattern requirement signal to the second processor to cause the plurality of display modules to display a plurality of identification patterns in response to the identification pattern requirement signal, wherein the plurality of identification patterns are different from one another, and each of the plurality of identification patterns includes position information corresponding to a respective one of the plurality of display modules for determining positional relationships among the display modules.

2. The display device calibration system according to claim 1, wherein the first processor is configured to perform that the target single color value divides by the reference single color value to generate the estimated value.

3. The display device calibration system according to claim 1, wherein the electronic device is configured to obtain a second image of a part of the plurality of display modules of the display device through the camera, and the first processor is configured to analyze the second image to obtain position information of the plurality of display modules according to the plurality of identification patterns, and wherein the first processor is configured to determine positions of the target display module and the reference display module according to the position information.

4. The display device calibration system according to claim 3, wherein the plurality of identification patterns are a plurality of data matrices or a plurality of quick response codes.

5. The display device calibration system according to claim 3, wherein the second image comprises an image of a plurality of module images corresponding to the part of the plurality of display modules.

6. The display device calibration system according to claim 1, wherein the first image comprises an image of a plurality of module images corresponding to the part of the plurality of display modules.

7. The display device calibration system according to claim 1, wherein the first processor is configured to send a color pattern requirement signal to the second processor to require the plurality of display modules; and the target display module and the reference display module are configured to be driven to display same color pattern according to the color pattern requirement signal.

8. The display device calibration system according to claim 7, wherein the target display module and the reference display module are configured to display same red pattern, same green pattern, or blue pattern, or same white pattern.

9. The display device calibration system according to claim 1, wherein each of the plurality of display modules comprises:

a third processor, communicatively connected to the second processor; and a storage medium, electronically coupled to the third processor, and stores a setting single color value, wherein the third processor of the target display module is configured to read the setting single color value from the storage medium, and the third processor of the target display module is configured to provide the setting single color value to the first processor.

10. The display device calibration system according to claim 9, wherein the third processor is configured to overwrite the adjusted setting single color value into the storage medium of the target display module.

11. A display device calibration method, comprising:

triggering a plurality of display modules of a display device to display a plurality of identification patterns, wherein the plurality of identification patterns are different from one another, and each of the plurality of identification patterns includes position information corresponding to a respective one of the plurality of display modules for determining positional relationships among the display modules;

obtaining a first image of a part of the plurality of display modules through a camera;

analyzing the first image to determine a target single color value of a target display module and a reference single color value of a reference display module, wherein the part of the plurality of display modules comprises the target display module and the reference display module;

obtaining an estimated value according to the target single color value and the reference single color value;

determining whether the estimated value is within a predetermined range;

providing a correction signal to the display device in response to the estimated value not being within the predetermined range; and adjusting the target single color value until the estimated value is within the predetermined range.

12. The display device calibration method according to claim 11, wherein the step of obtaining the estimated value comprising:

performing that the target single color value divides by the reference single color value to generate the estimated value.

13. The display device calibration method according to claim 11, further comprising:

obtaining a second image of a part of the plurality of display modules of the display device through the camera;

analyzing the second image to obtain position information of the plurality of display modules according to the plurality of identification patterns; and determining positions of the target display module and the reference display module according to the position information.

14. The display device calibration method according to claim 13, wherein the plurality of identification patterns are a plurality of data matrices or a plurality of quick response codes.

15. The display device calibration method according to claim 13, wherein the second image comprises an image of a plurality of module images corresponding to the part of the plurality of display modules.

16. The display device calibration method according to claim 11, wherein the first image comprises an image of a plurality of module images corresponding to the part of the plurality of display modules.

17. The display device calibration method according to claim 11, further comprising:

sending a color pattern requirement signal to the plurality of display modules; and driving the target display module and the reference display module to display same color pattern.

18. The display device calibration method according to claim 11, wherein the target display module and the reference display module are configured to display same red pattern, same green pattern, same blue pattern or same white pattern.

19. The display device calibration method according to claim 11, further comprising:

generating an adjusted setting single color value according to a setting single color value and the estimated value after receiving the setting single color value provided by the target display module.

20. A non-transitory processor-readable storage medium, storing at least one program, and being executed by a processor to perform following steps:

triggering a plurality of display modules of a display device to display a plurality of identification patterns, wherein the plurality of identification patterns are different from one another, and each of the plurality of identification patterns includes position information corresponding to a respective one of the plurality of display modules for determining positional relationships among the display modules;

obtaining a first image of a part of the plurality of display modules through a camera;

analyzing the first image to determine a target single color value of a target display module and a reference single color value of a reference display module, wherein the part of the plurality of display modules comprises the target display module and the reference display module;

obtaining an estimated value according to the target single color value and the reference single color value;

determining whether the estimated value is within a predetermined range;

providing a correction signal to the display device when the estimated value is not within the predetermined range; and adjusting the target single color value until the estimated value is within the predetermined range.

* * * * *